W. R. MELSON.
VINE CUTTING ATTACHMENT FOR PLOWS.
APPLICATION FILED AUG. 6, 1909.

970,379.

Patented Sept. 13, 1910.

2 SHEETS—SHEET 1.

Witnesses
C. K. Reichenbach
John W. Conner

Inventor
William R. Melson,
By E. W. Bradford
Attorney

W. R. MELSON.
VINE CUTTING ATTACHMENT FOR PLOWS.
APPLICATION FILED AUG. 6, 1909.
970,379.
Patented Sept. 13, 1910.
2 SHEETS—SHEET 2.
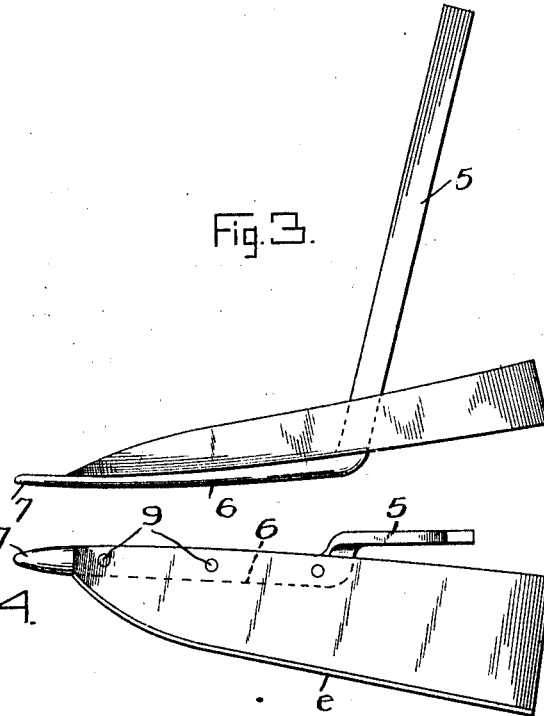
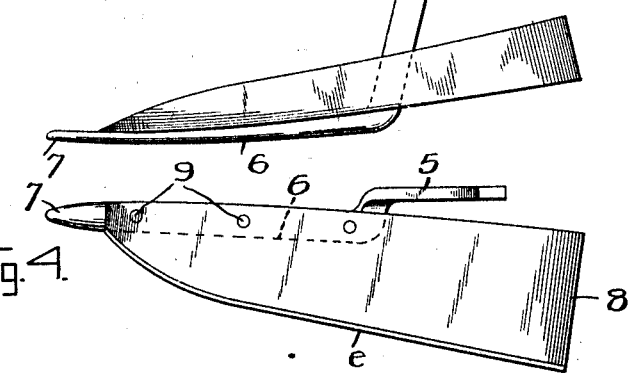
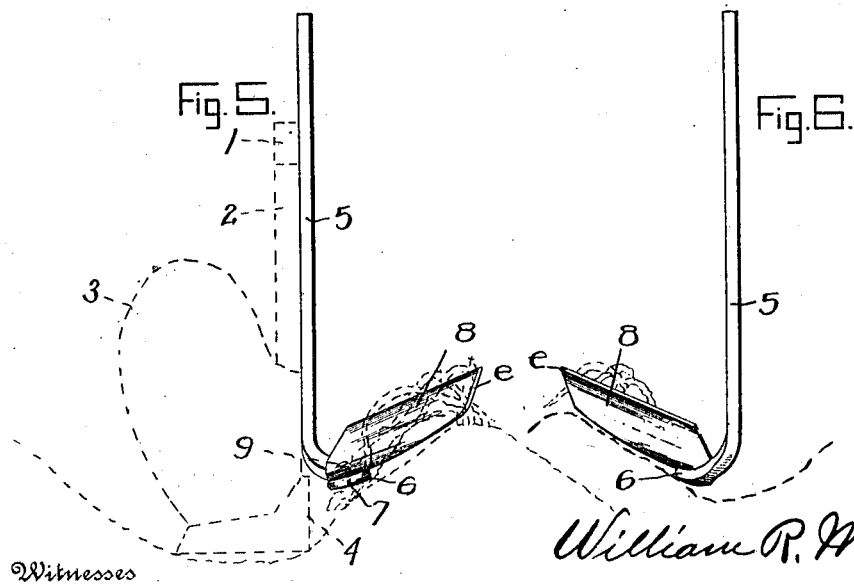

UNITED STATES PATENT OFFICE.

WILLIAM R. MELSON, OF MAMIE, NORTH CAROLINA, ASSIGNOR OF ONE-HALF TO WILLIAM D. PERRY, OF MAMIE, NORTH CAROLINA.

VINE-CUTTING ATTACHMENT FOR PLOWS.

970,379. Specification of Letters Patent. Patented Sept. 13, 1910.

Application filed August 6, 1909. Serial No. 511,618.

*To all whom it may concern:*

Be it known that I, WILLIAM R. MELSON, a citizen of the United States, residing at Mamie, in the county of Currituck and State of North Carolina, have invented certain new and useful Improvements in Vine-Cutting Attachments for Plows, of which the following is a specification.

The object of my said invention is to provide an attachment for plows for cutting vines, such as sweet potato vines, etc., from the tops of the rows, or ridges, before plowing the potatoes out of the ground, and it consists in a sharp knife of peculiar design mounted at a suitable angle on a shank and attaching the same to the land-side of the plow in position so that the same will shear the vines from the top of the row as the plow is drawn alongside said row, all as will be hereinafter more fully described and claimed.

Figure 1:
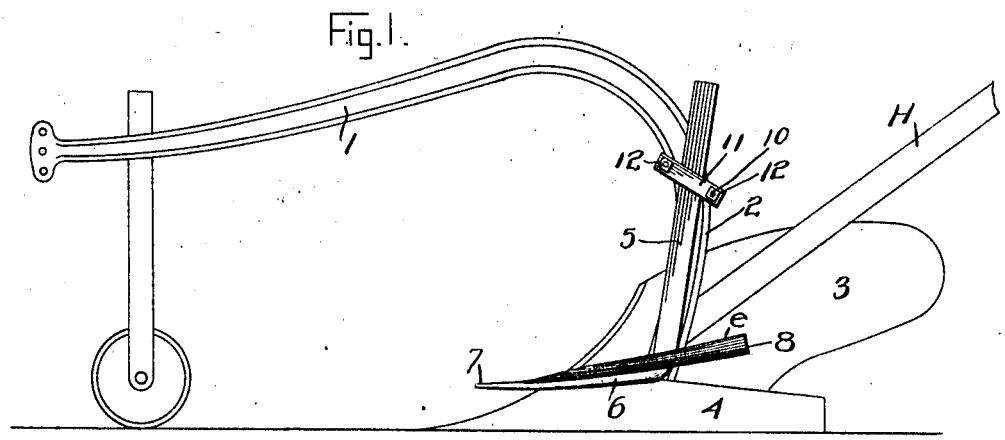
Figure 2:
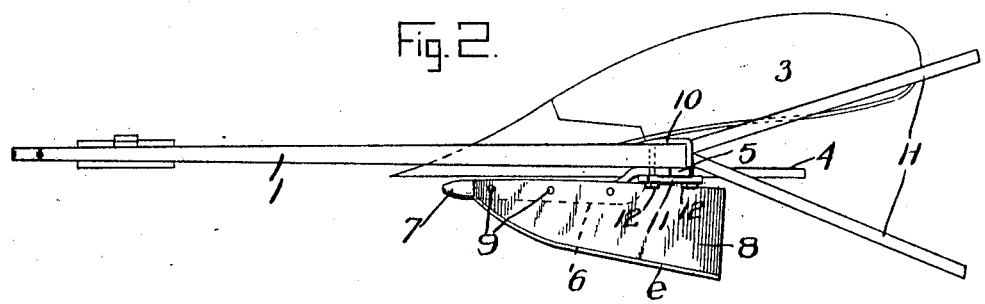

Referring to the accompanying drawings which are made a part hereof and on which similar reference characters indicate similar parts, Figure 1 is a side elevation of the land-side of a plow with my attachment thereon, Fig. 2 a top or plan view of the same, Fig. 3 a side elevation of the cutting attachment, Fig. 4 a top or plan view of the same, Fig. 5 a front elevation of the cutting attachment, and Fig. 6 a rear elevation of the same.

The plow consisting of the plow-beam 1 with the vertical shank 2 having the mold-board 3 and the land-side 4 attached thereto is, or may be, of any ordinary construction. It is provided with handles H attached in the usual manner by which the plow may be manipulated by the operator.

The cutting attachment comprises a shank 5 having a section 6 bent at an angle nearly at right angles therewith, and adapted to extend in substantially a horizontal direction from its lower end to the outer end or nose 7, which is formed pointed and adapted to serve to pick up the vines. The horizontal portion 6 is formed with a shoulder immediately behind the point or nose 7 and is flattened to form an appropriate face on which the inner edge of a blade 8 may be mounted. Said blade 8 is of steel adapted to carry a sharp edge $e$, which is formed on its outside. It is riveted, or bolted, to the part 6 of the shank 5 by means of bolts or rivets 9. The shank 5 is attached to the vertical part 2 of the beam 1 by means of a clevis 10, having a cross bar 11 and nuts 12, of an ordinary form. The clevis is arranged as shown in Figs. 1 and 2 to permit of the vertical adjustment of the cutter, as may be found desirable.

In use, the cutter is preferably adjusted to substantially the upper edge of the land-side 4 and in this position the nose 7 of the part 6 will run along the surface of the hills containing the potatoes near the lower side thereof and pick up the vines and guide them onto the edge $e$ of the blade 8. Said blade 8 is formed and arranged with its outer edge extending at an angle upwardly, as indicated most clearly in Figs. 5 and 6, so that the under surface of the blade will rest and slide along the surface of the hills or rows with the edge in close proximity to the surface. Said edge extends rearwardly for a considerable distance and at a transverse angle, being narrow at its front and wide at its rear end as indicated most clearly in Figs. 2 and 4, and serves to shear the vines, cutting them clean from the roots and turning them back away from the hill by reason of the angle at which the blade is carried and the angle of its cutting edge.

In operation, the plow is driven between the rows of the potatoes to slide upon the surface and the operator, by means of the handles, guides the same so that the cutting blade will stand in substantially the position shown in Figs. 5 and 6 in relation to the rows, which will operate as above described to shear the vines from the roots and clean one side of the row. He then returns on the other side of the row and cuts the vines from that side, which leaves the row clean of potato tops. After the vines have thus been cut from the rows the attachment may be removed and the plow then driven through under the potatoes, (or, as will be readily understood, a separate plow may be used), which plows them out of the ground turning the soil on top of the potato tops which are between the rows, thus rapidly and efficiently harvesting the potatoes without any expensive machinery and in a manner so simple that it can be done without skilled help.

Having thus fully described my said invention, what I claim as new, and desire to secure by Letters Patent, is:

1. A plow attachment comprising a cutting blade mounted on a shank at an angle, with its outside edge and rear end extending upwardly from its inner edge and front end, said front end being adapted to run under the vines, substantially as set forth.

2. An attachment for plows comprising a shank carrying a cutting blade extending in a substantially horizontal position with its outside edge sharpened and said outside edge and its rear end extending at an angle upwardly from its inside edge and front end, substantially as set forth.

3. An attachment for plows for cutting vines comprising a shank adapted to be adjustably secured to the land-side of said plow and having a lower section extending forward at a slight angle downwardly from said shank and formed with a nose on its outer end, and a blade secured on said section extending back from said nose with its outside edge and rear end extending upwardly at an angle from its inner edge and front end, said outside edge being sharpened and also extending at an angle transversely from front to rear, substantially as set forth.

4. A cutting attachment for plows comprising a horizontal blade mounted on a support attached to said plow and formed with a narrow front end and a wide rear end with its outside edge extending at an angle upwardly from its inner edge, substantially as set forth.

5. A potato vine cutter comprising a blade mounted on a shank adapted for attachment to a draft beam, said blade being formed with a sharp outside edge and arranged with said edge extending at an angle transversely of the work and with the blade extending at an angle upwardly from its inner edge and front end toward its outside edge and rear end, substantially as set forth.

In witness whereof, I have hereunto set my hand and seal at Mamie, North Carolina, this 28th day of July, A. D. nineteen hundred and nine.

WILLIAM R. MELSON. [L. s.]

Witnesses:
J. L. FORBES,
C. H. WILSON.